Figure 1:
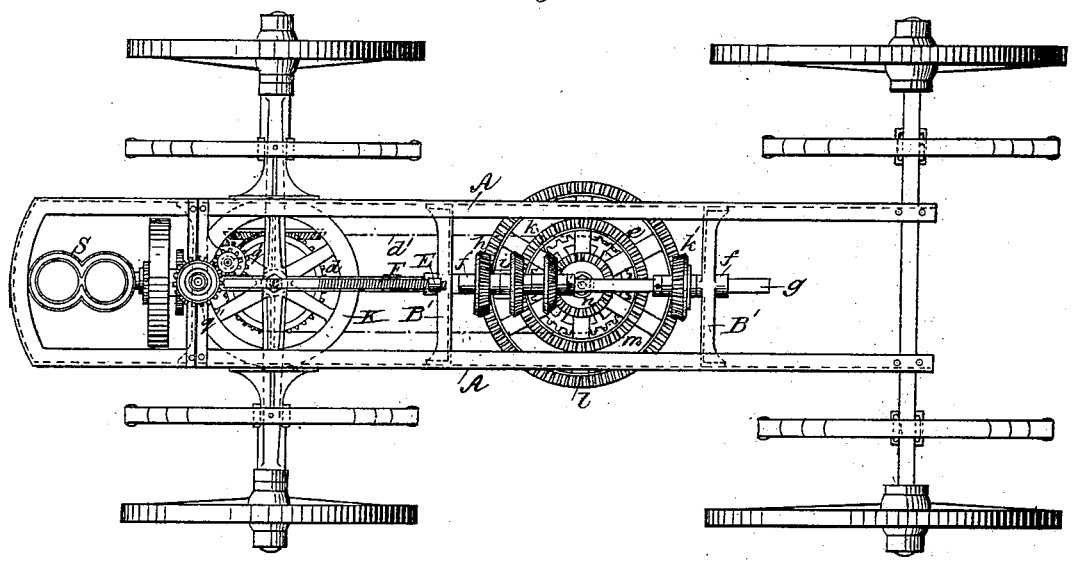

No. 626,735. Patented June 13, 1899.
H. STOMMEL.
MOTOR VEHICLE.
(Application filed July 9, 1898.)
(No Model.) 3 Sheets—Sheet 1.

Witnesses:
Geo. W. Linkins
James M. Woodward

Inventor:
Hugo Stommel,
By T. C. Brecht,
Attorney.

No. 626,735. Patented June 13, 1899.
H. STOMMEL.
MOTOR VEHICLE.
(Application filed July 9, 1898.)
(No Model.) 3 Sheets—Sheet 2.
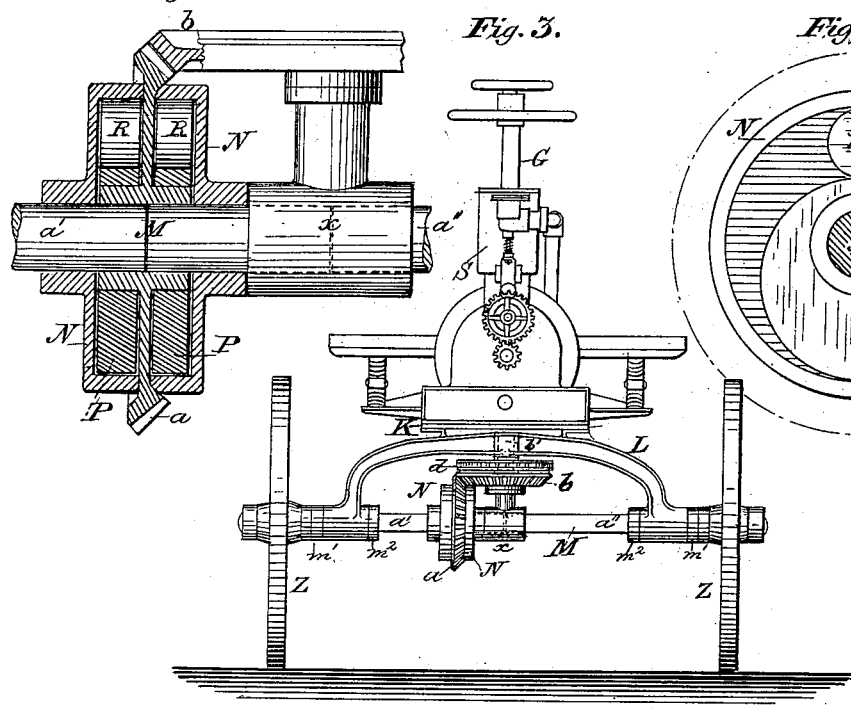
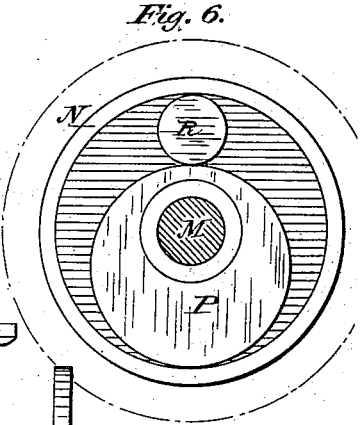
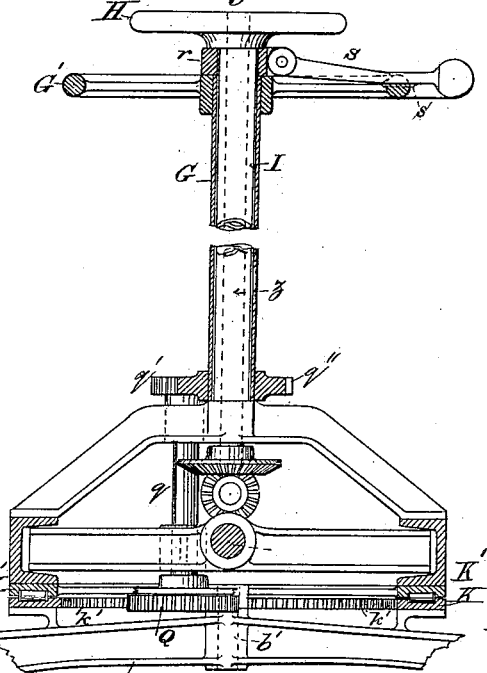
Witnesses:
Inventor:
Hugo Stommel,
By T. C. Brecht,
Attorney.

No. 626,735. Patented June 13, 1899.
H. STOMMEL.
MOTOR VEHICLE.
(Application filed July 9, 1898.)
(No Model.) 3 Sheets—Sheet 3.
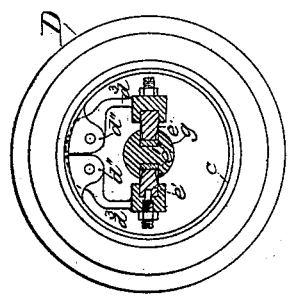
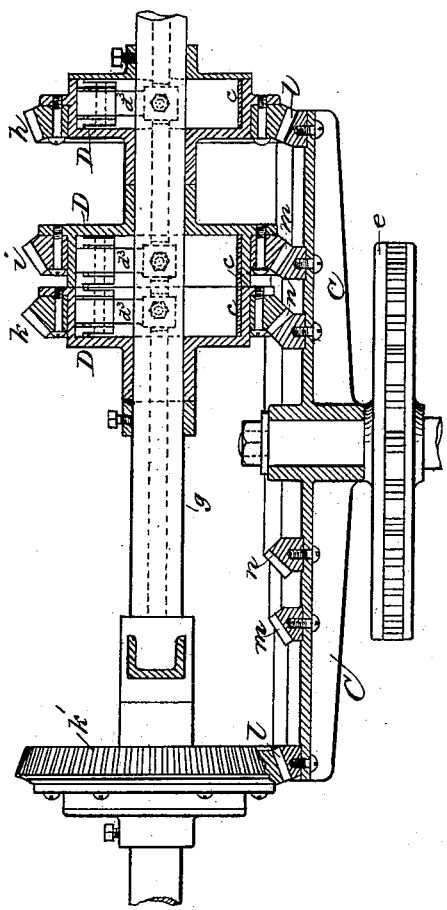
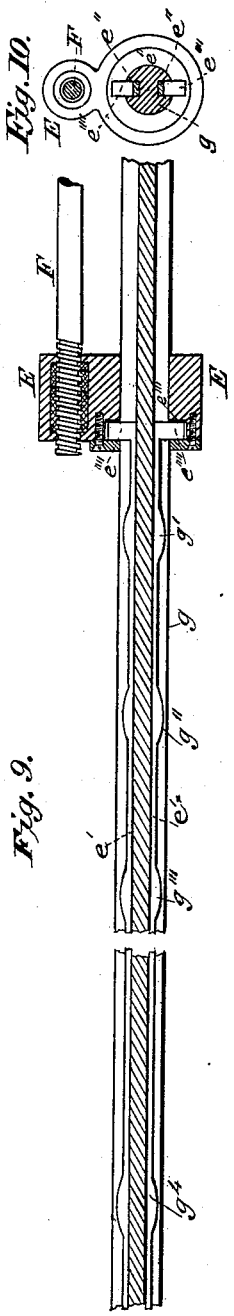
Witnesses:
Geo. W. Linkins.
James M. Woodward.
Inventor:
Hugo Stommel,
By T. C. Brecht
Attorney.

UNITED STATES PATENT OFFICE.

HUGO STOMMEL, OF PLAINFIELD, NEW JERSEY.

MOTOR-VEHICLE.

SPECIFICATION forming part of Letters Patent No. 626,735, dated June 13, 1899.

Application filed July 9, 1898. Serial No. 685,479. (No model.)

*To all whom it may concern:*

Be it known that I, HUGO STOMMEL, a citizen of the United States, residing at Plainfield, in the State of New Jersey, have invented certain new and useful Improvements in Motor-Vehicles; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in that class of vehicles known as "horseless or motor wagons."

The objects of the invention are to produce a motor vehicle or wagon applicable to express-wagons, buggies, or any other kind of vehicles and to dispense with the use of horses and causing the vehicles to be driven by engines of any suitable kind; also, to simplify the construction of such wagons as well as their operation and manipulation; also, to greatly reduce their cost in construction, and, finally, to produce a vehicle that is equally adaptable to business and pleasure purposes.

With these objects in view my invention consists in the peculiar construction of details and the novel arrangement of parts, as will be more fully described hereinafter and specifically pointed out in the drawings and letters thereon.

Like letters indicate similar parts in the different figures of the drawings, in which—

Figure 2:
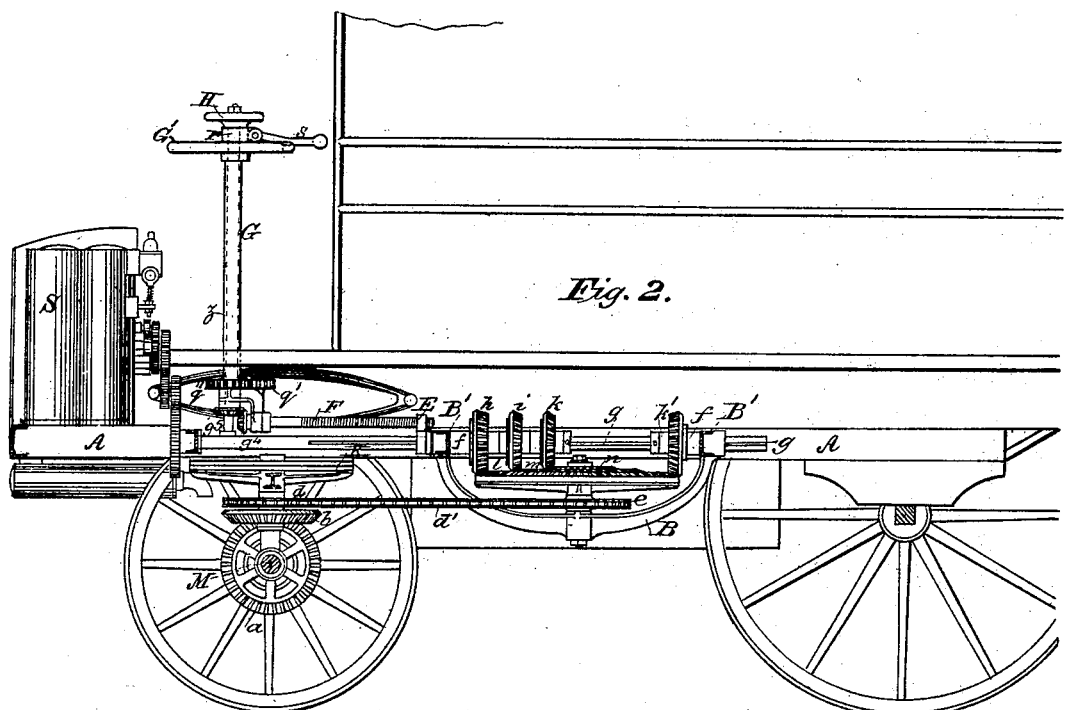

Figure 1 represents a plan or top view of my improved motor-wagon with the body removed. Fig. 2 is a side elevation of the same, partly in section and with the front wheels removed. Fig. 3 is an end elevation of the same. Figs. 4, 5, 6, 7, 8, 9, and 10 are detail views of different parts of the same on an enlarged scale.

In the drawings, A represents the main frame, which is made of channel-iron and serves to support the different parts of the mechanism as well as the body. To this frame the body of the wagon, carriage, &c., with the front wheels shown removed, is bolted or secured to the axles. To the front axle of the vehicle is secured a bevel or miter wheel $a$, that meshes with another bevel-wheel $b$, which is secured to vertical axle $b'$. On this axle a sprocket-wheel $d$, in connection with the bevel-wheel $b$, is secured, and by said sprocket-wheel $d$ and a sprocket-chain $d'$ imparts motion to a sprocket-wheel $e$, secured to a short vertical shaft supported in the arched double-armed bracket B, which is connected at its ends to the cross-pieces B', likewise of channel-iron. Said bracket is provided with the bearings $f$ for the horizontal shaft $g$. This shaft extends backward and carries the three bevel-pinions $h\, i\, k$, that respectively mesh with the bevel-wheels $l\, m\, n$, which are formed of toothed rings secured to the arms C, as best seen in Fig. 7. To the backs of the pinions $h\, i\, k$ are secured the hollow drums D, in which are arranged the circular springs $c$, cut at one side and having at each end the lugs $d''$, to which the bent arms $d^3$ are attached. These arms are provided with rectangular pieces $e'$, that engage with the splines or grooves in the shaft $g$. In these splines are placed movable flat keys or rods $e''$, which at certain intervals are provided with bulbs $g'$ or their equivalents, that engage with said rods, as described later. The movements of the rods $e''$ endwise are accomplished through a collar, having a recess $e'''$ at one side, which allows the turning of the rods $e''$ by the noses $e^4$ with the shaft $g$. The said recess $e'''$ is large enough to permit the rods $e''$, with their noses $e^4$, to revolve freely with the shaft. The rods $e''$, provided with the bulbs $g'$, pass between the levers $d^3$ and serve to expand the spring $c$, thus connecting the different pinions to the rod $g$ and causing them to revolve therewith. This is done by the nut E, moved in one or the other direction by the screw F, preferably provided with a square thread. The movement of the screw is accomplished by means of the bevel-wheels $g^4\, g^5$, Fig. 2, in connection with the rod $z$, Fig. 4, and the hand-wheel H. This rod $z$ passes through the hollow shaft I, which is supported in the column or tube G, secured to the frame.

The fifth-wheel K is arranged on an arched or double-armed bracket L, forming bearings at each side for the front axle M, as best seen in Fig. 3, and on said axle is placed the miter or bevel wheel $a$, which meshes with another miter $b$, secured to a vertical shaft $b'$, that passes into the hub of the upper part of the fifth-wheel. On each side of said wheel $a$ are placed the drums N, (best seen in Fig. 5,) in which the eccentrics P—one on each side of the wheel $a$—are placed and ordinarily revolve with the axle M. When turning a corner, the friction-rollers R become loose and allow the wheel to turn, and when the vehicle is in straight direction again the rollers become clamped again between the eccentrics P and the drum N. The miter $b$, in connection with the sprocket-gear $d$, thus acts as a loose wheel, the shaft being journaled in the bearing $x$ on the front axle. This axle is made in two parts held together by the collars $m'$ $m^2$, so that they can revolve independently. The lower part of the fifth-wheel is provided with internal teeth $k'$, with which the pinion Q, Fig. 4, meshes. This drives the axle $q$, with pinion $q'$, which meshes with the wheel $q''$, secured on the hollow shaft G and carrying at its upper end the hand-wheel G'. This wheel is provided with a notch in its rim, and a collar $r$ is secured to the inner shaft I in the hollow shaft G. A weighted lever $s$ is pivoted to said collar and has a projection $s'$, that fits into said notch and holds the wagon in a straight line. In steering the wagon the lever $s$ is raised out of the notch, the wheel is turned, and by it will impart the required direction to the wagon.

For turning corners or short angles the front axle is provided with a compensating gear which permits one or the other wheel on the axle M to slip. This axle, as stated, is made in two parts $a'$ and $a''$. (Best seen in Figs. 3 and 5.) The compensating gear, with the drums N, in which are arranged the eccentrics P, has the loose friction-rollers R, that act in the following manner: Ordinarily the bevel-wheel $a$ revolves with the axle M; but in turning corners, &c., the one eccentric will revolve, while the other one will remain stationary, by the friction-roller becoming jammed between the inner side of the drum and the eccentric on that side, thus causing that part of the axle to revolve. When going in a straight line, the friction-roller will become loose again and the driving-wheel can revolve with the axle, as usual.

I prefer to use rawhide gear-wheels in connection with iron-toothed gears to prevent noise or clatter.

The operating-motor S consists, preferably, of a gas-engine which is placed on the front part of the frame of the vehicle, and it is incased with non-conducting casing to prevent radiation.

The operation is as follows: The engine having been started, the shaft $g$ will revolve and the bevel-pinions $h$ $i$ $k$ $k'$ will remain still. By turning the hand-wheel H the screw F will revolve and gradually push the rods $e'$ until the bulb $g'$ enters between the spring-levers $d^3$. By doing this the levers will spread apart the spring-ring $c$ tight against the interior of the first drum D and by friction will cause the pinion $h$ to drive the bevel-wheel $l$, and thus the sprocket-wheels $e$ and $d$, imparting the slowest rate of speed. If it is desired to increase the speed, the bulb $g^2$ is pushed through the bevel-wheel $h$ and into the pinion $i$, in which case it will mesh with the wheel $m$, causing it to revolve, giving a quicker speed. The same action will take place by pinion $k$ being geared with wheel $n$, causing the fastest speed. If it is desired to reverse the wagon, the rods will be drawn back until the bulb $g^4$ engages with pinion $k'$ and imparts a reverse motion to the wheel $l$ and causes the vehicle to back. This is a very important part of my invention, as by the changes of these pinions to the wheels of different diameters the speeds of the vehicle can be increased or decreased as desired, and by meshing the pinion $k'$ into the wheel $l$ the action of the vehicle will be reversed.

One of the great advantages of my motor-vehicle is that it can be manipulated by the driver from his seat by simply turning the hand-wheels, as desired.

Having thus described my invention, what I claim, and desire to secure by Letters Patent, is—

1. In motor-vehicles, the differential gear described, consisting of bevel-pinions provided with hollow drums containing pivoted arms, actuated by rods having bulbs, for forcing the arms and the spring against the interior of said drums, and the rods moved longitudinally by a nut and screw, receiving motion by gearing and a vertical shaft with hand-wheel, arranged at the front of the vehicle, as specified.

2. In motor-vehicles, the combination of the pinions $h$, $i$, $k$, and bevel-wheels $l$, $m$, $n$, with the nut E, screw F, and its actuating mechanism, with the pinion $k'$ arranged for reversing the vehicle in the manner shown and herein set forth.

3. In motor-vehicles, the pinions $h$, $i$, $k$, $k'$, provided with hollow drums on their backs, containing pivoted levers $d^3$, actuating spring-rings $c$, by the flat rods $e'$, having bulbs for forcing them apart, when actuated by the screw F and nut E, operated by the hand-wheel and gearing as shown and set forth.

4. In motor-vehicles the fifth-wheel having internal gear-teeth, with which the pinion Q meshes, with the axle $q$, having pinion $q'$ meshing with wheel $q''$, secured to the hollow shaft G, having the hand-wheel G', provided with a notch for the lever $s$, pivoted to the collar $r$, that is secured to the shaft I, in the manner set forth.

5. In motor-vehicles, the combination of the differential bevel pinions and wheels meshing therewith, supported in a double-armed bracket and actuated by a nut and screw, operated by the mechanism and gearing herein shown and in the manner set forth.

6. The combination of the differential pinions and wheels meshing together and their actuating mechanism, with the sprocket-wheels $e$ and $d$ and sprocket-chain $d'$, the miter-wheels $b$ and $a$, operating the front axle M, all arranged as shown and herein specified.

7. The motor-vehicle herein described consisting of a frame A, supported on wheels and axles, and having a gas-engine, in combination with the fifth-wheel and its actuating-gearing, the differential bevel-gearing, the compensating gear and the shafts $z$, I and G with their hand-wheels, all arranged as shown and specified.

In testimony whereof I affix my signature in presence of two witnesses.

HUGO STOMMEL.

Witnesses:
   GEO. W. LINKINS,
   JAMES M. WOODWARD.